(No Model.)
G. G. HUNT.
REEL FOR HARVESTERS.
No. 286,304. Patented Oct. 9, 1883.
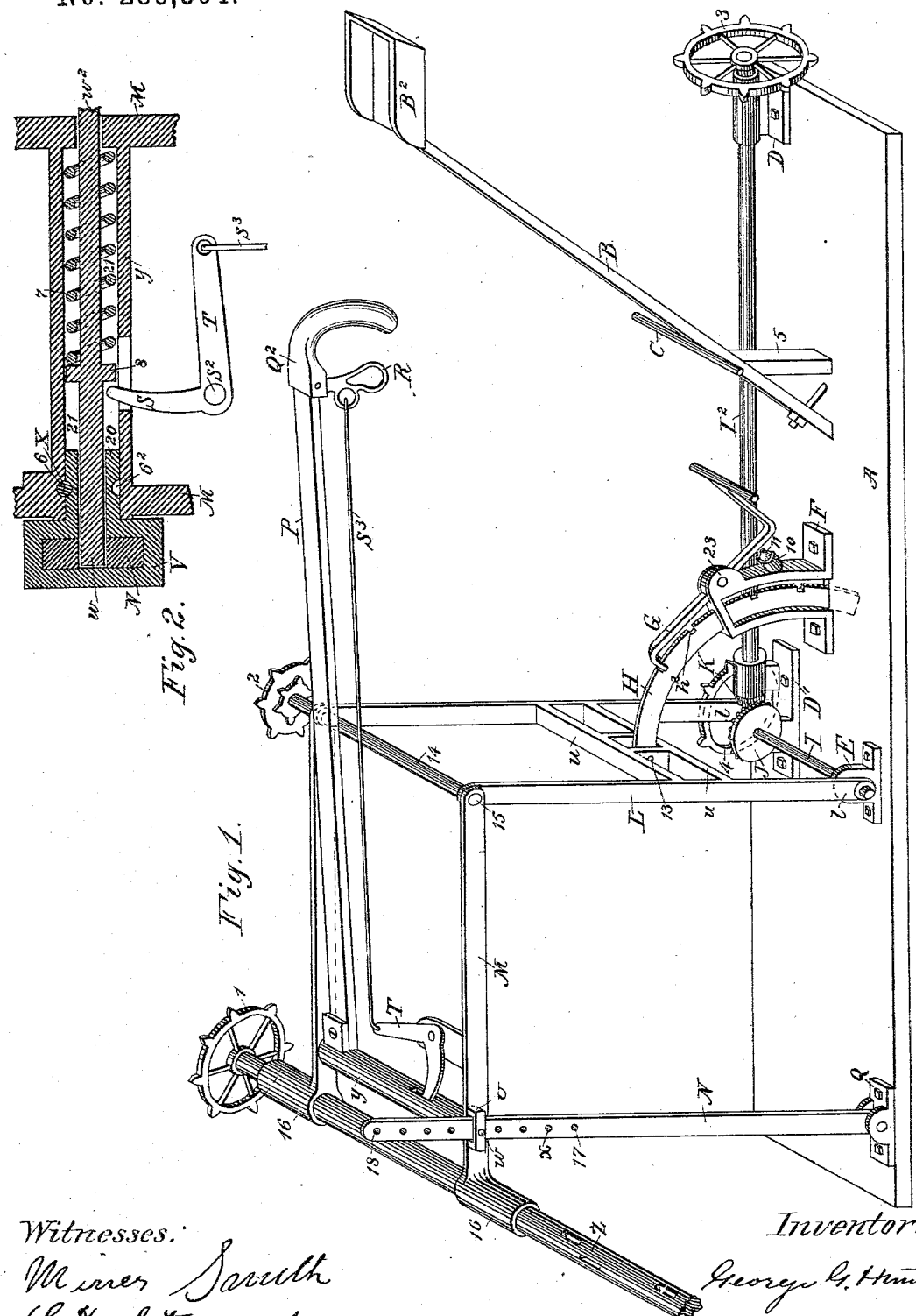
Witnesses:
Inventor,
George G. Hunt

UNITED STATES PATENT OFFICE.

GEORGE G. HUNT, OF BRISTOL, ASSIGNOR OF ONE-HALF TO THE PLANO MANUFACTURING COMPANY, OF PLANO, ILLINOIS.

REEL FOR HARVESTERS.

SPECIFICATION forming part of Letters Patent No. 286,304, dated October 9, 1883.

Application filed April 22, 1882. (No model.)

*To all whom it may concern:*

Be it known that I, GEORGE G. HUNT, of Bristol, Kendall county, Illinois, have invented a new and useful Improvement in Reels for Harvesters, of which the following is a specification.

My invention relates to certain devices whereby the means of adjusting the reel to the sickle, either up or down, or forward and back, is easier and better accomplished than has heretofore been known or used; and also in connection with said means to devices for holding the reel fast in the desired position.

In the drawings accompanying and forming a part of this specification, and in which similar letters of reference in the several figures indicate like parts, Figure 1 is a perspective view of my invention, showing the "seat-plank" and the reel-operating devices attached. Fig. 2 is an enlarged horizontal central sectional view of the part Y, Fig. 1.

In Fig. 1, A is the seat-plank, which is fastened to the harvester in the usual way. Upon this plank is fastened the "seat-spring" B, to which is attached the seat $B^2$ and foot-rest C. Additional support is obtained for the seat-spring by a block, 5. Bolted to the seat-plank are boxes D and D', in which runs a shaft, $I^2$, which is driven by a chain running from the driving mechanism of the harvester onto the sprocket-wheel 3. Attached to the seat-plank is a journal-box, E, in which one end of a shaft, I, runs, the opposite end of which runs in a box which is cast onto the base of the box D'; but the two boxes in the piece D' stand at right angles to each other and in the same horizontal plane. A connection is made by a bevel-pinion, K, fastened to the shaft $I^2$, and a bevel-wheel, J, fastened to the shaft I, by which the shaft I is driven. Each end of the shaft I projects through the outside of the boxes, in which the shaft runs far enough to pass loosely through the lower parts, $l l$, of the vertical frame L, which is thus pivoted upon the shaft I. The upper part, 14, of the frame L is cored out to receive a shaft, 15, which extends entirely through the frame L, and projects far enough upon each side to allow of pivoting upon it a horizontal frame, M, and upon one side an additional length of the shaft 15 is allowed sufficient for fastening (but not rigidly) a double sprocket-wheel, 2, which is driven by a chain passing over a sprocket-wheel, 4, attached to the shaft I.

Cast on, and forming a part of the horizontal frame M, are journal-boxes 16 16, through which passes the reel-shaft Z, onto one part of which are fastened the reel-arms, and on the opposite end is fastened, rigidly, a sprocket-wheel, 1, which is driven by a chain passing over and from one member of the double sprocket-wheel 2. A casting, Q, is attached to the front end of the seat-plank, to which casting is pivoted a supporting-standard, N, (preferably of wrought-iron,) which is provided with a number of holes, $x$ $x$, &c. This standard I make about one and one-quarter inches wide and five-sixteenths of an inch thick. The standard N passes loosely through an opening in one end of a swiveling piece, V, one part, 20, Fig. 2, of which is turned and fits into a bored cavity, 21, Fig. 2, in the part Y. A groove, $6^2$, Fig. 2, is turned in the swiveling piece V to receive a vertical pin, X, inserted in a hole bored in the frame M at 6, Fig. 2. One half of the pin X is thus in the body of the frame M, and the other half lies in the groove $6^2$. The swiveling piece V is thus held from moving longitudinally, yet can turn freely on its axis within the scope of the position required—that is to say, it can adjust itself to the standard in its different positions, and by this means "cramping" or binding of the parts is avoided. The swiveling piece V is provided with a central aperture, through which one end of a sliding bolt, $w$, passes, the opposite end of which rests in and is guided by an opening, $w^2$, in the frame M. The bolt $w$ is encircled by a spiral spring, 7, one end of which abuts against the body of the frame M and the opposite end against a collar, 8, on the bolt. The adjustment of the bolt and spring is such that the bolt is forced by the spring through the swiveling piece far enough to pass through the standard N, where it can be checked by the swivel itself, or by the arm S of the bent lever T. One arm, S, of a bent lever, T, (which is fulcrumed at $S^2$,) passes through an opening in Y and catches against a collar, 8, upon the bolt $w$.

To the end of the bent lever T is attached a rod, S³, which extends along a hand-lever, P, to a latch, R, which is hinged in a handle, Q². The hand-lever P is bolted fast to the horizontal frame M by screw-bolts, as shown in Fig. 1.

Attached to the seat-plank is a standard or bracket, F, which is made to receive and steady one end of a segmental metallic piece, H, which is provided with notches $h^2$ on its upper edge. These notches are to receive the hooked end of a foot-lever, G, which has its fulcrum on a bolt, 23. The bracket F is provided with a hollow member, 10, in which is a spiral spring encircling a sliding bolt, 11, which abuts against the under side of the rear end of foot-lever G. The bolt 11 has a collar similar to the one on the bolt $w$ in Fig. 2. Against this collar the spiral spring presses, thus forcing the bolt hard against the lever G, causing the hooked end to fall in the notches in member H.

The frame L is provided with cross-bars $u$ $u$, to which are attached vertical members, which connect the cross-bars. Between these vertical members one end of the segmental piece H passes, and is there held by a bolt or pin, 13, which passes through the vertical members referred to and the segmental piece itself.

The operation of this invention is as follows: If it is desirable to move the reel forward or backward, the operator will grasp the handle Q². He will then press with his foot on the foot-piece of lever G, which will disconnect the lever from the notch in segmental rack H, when the reel can be moved in the desired position forward or back, as the case may be. Should a movement of the reel, up or down, be required, the latch R is pulled back, which, by means of the rod S³, pulls upon one arm of the bent lever T, which thus causes the arm S of same lever to throw back and disengage the bolt $w$ from the standard N. Then, by pressing down or raising up upon the handle of the hand-lever P, as the case may require, the reel may be raised or lowered.

In the reel mechanism referred to in use heretofore the shaft I² was mounted on the seat-plank on the side next to the platform or grain side; also, the sprocket-wheels 4, 2, and 1, together with the chains driving them. This caused trouble by the tangling of grain in the gearing, as loose straws were carried up by the reel unavoidably. In my improved reel mechanism all the gearing is placed on the side next the elevator, except the bevel-wheel J, which of necessity is placed between the parts $l\ l$ of the frame L, for the reason that the wheel J has to be on that side of the shaft I² for the motion to be in the right direction, as the motion of the sprocket-wheel 3 is in the direction shown by the arrow.

Having thus described my invention, what I claim as new, and desire to secure by Letters Patent, is—

1. The bracket or standard F, in combination with a foot-releasing lever, G, rack or member H, and vibrating frame L, for the purpose and in the manner described.

2. Combined with the adjustable frame M and the bar N, the swivel V, and the locking device, substantially as described.

3. The standard N, in combination with a swiveling piece, V, sliding bolt $w$, and frame M, for the purpose and in the manner specified.

4. Combined with the seat-plank A and with the reel-shaft of a harvester, a counter-shaft, I², and connected gearing placed on that side of the seat-plank next the grain-elevator, substantially for the purpose set forth.

GEORGE G. HUNT.

Witnesses:
GEO. BLAKELY,
G. H. STEWARD.